UNITED STATES PATENT OFFICE

2,150,096

PROCESS FOR APPLYING CELLULOSE DERIVATIVE LACQUERS

Charles Bogin, Terre Haute, Ind., assignor to Commercial Solvents Corporation, Terre Haute, Ind., a corporation of Maryland No Drawing. Application April 29, 1938, Serial No. 205,005

6 Claims. (Cl. 91—70)

My invention relates to a process for spray-coating cellulose derivative lacquers, and more particularly to such a process employing lacquers having a high concentration of solid constituents.

Cellulose derivative lacquers, such as the cellulose ester and cellulose ether lacquers, and particularly nitrocellulose lacquers, have been found to have numerous advantageous properties and have come into wide use in the arts. These materials, however, have had the disadvantage that only relatively low concentrations of solids could be employed without giving rise to extremely viscous products which could not be satisfactorily atomized in the usual spray method of application. The result has been that a number of coats of such materials have been required to secure a satisfactory finish, thus involving a considerable labor expense and expense for volatile solvents evaporated in the application of the necessary coats.

I have now discovered that cellulose derivative lacquers of greatly increased solids content may be satisfactorily used for spray-coating if the temperature of the lacquer in the spray gun is maintained substantially above the atmospheric temperature, and there is a suitable co-ordinated balance of the solid and solvent constituents of the lacquer. I have found that the expected difficulties with regard to poor flow, due to very great increase in viscosity resulting from extremely rapid evaporation of hot solvents and an extreme drop in temperature in the spray cone, are not encountered if care is taken to employ a suitable solvent mixture for the selected spraying temperature. According to my process, nitrocellulose lacquers which contain up to 50% more solids than the optimum concentration for spraying at atmospheric temperature may readily be used for spray-coating if they are sprayed at liquid temperatures 40–50° C. above atmospheric. If such lacquers are sprayed at a liquid temperature of approximately 60° C. they may be formulated with a concentration of solids 35–40% greater than the optimum concentration for spraying at a liquid temperature of 25° C.; and for spraying at a liquid temperature of 90° C., the lacquers may be formulated with a concentration of solids 65–70% above the optimum for 25° C. Correspondingly greater or smaller concentrations may be employed at higher or lower temperatures, and similar results can be secured with lacquers prepared from other cellulose derivatives.

I have discovered that contrary to the properties of numerous other types of colloidal solutions, the viscosity of cellulose derivative lacquers decreases continuously with rising temperature and the lacquers show no tendency to gel at high temperatures if they are formulated with a sufficiently high solvent-diluent ratio. In addition, I have found that the temperature-viscosity equilibrium is attained practically instantaneously, and this characteristic constitutes an outstanding practical advantage, as will be pointed out more fully below. The viscosity-temperature relationships of representative types of cellulose derivative lacquers are illustrated in the following table:

Table I

| | | Lacquer #1 | Lacquer #2 | Lacquer #3 | Lacquer #4 | Lacquer #5 |
|---|---|---|---|---|---|---|
| *Solids composition* (Parts by weight per 100 parts by weight of solvent mixture) | ¼ sec. nitrocellulose [1] | 23.5 | 17.4 | | | |
| | ½ sec. nitrocellulose [2] | | | 21.0 | | |
| | 3–8 sec. cellulose acetate [3] | | | | 10.1 | |
| | ¼ sec. ethyl cellulose | | | | | 10.1 |
| | Ester gum | 11.8 | | | | |
| | Synthetic resin [4] | | 17.4 | | | |
| | Dibutyl phthalate | 8.2 | 6.1 | | | |
| *Solvents composition* (Parts by volume) | Butyl acetate | 40 | 40 | | | |
| | Butyl alcohol | 25 | 25 | 20 | | 20 |
| | Ethyl alcohol | | | 80 | | |
| | Diacetone alcohol | | | | 100 | |
| | Xylol | 35 | 35 | | | 80 |
| *Viscosity* (In centipoises at temperature indicated) | 25° C | 390 | 350 | 337 | 350 | 325 |
| | 40° C | 220 | 173 | 197 | 142 | 178 |
| | 50° C | 130 | 115 | [5] 112 | 81 | 143 |
| | 65° C | 90 | 68 | | 43 | 68 |
| | 80° C | [5] 60 | [5] 43 | | 23 | 43 |
| | 90° C | | | | 17 | 37 |

[1] Regular grade.
[2] Alcohol soluble grade.
[3] Acetyl No.=38.7–39.4.
[4] Oil modified glycerol-phthalate resin "Rezyl 19".
[5] Slight ebullition at temperature indicated.

As may be seen from the above table, the upper temperature for spraying lacquers in accordance with my invention may be limited by the temperature of initial ebullition of the solvent mixture employed. However, by utilizing less volatile solvents the upper temperatures may be greatly increased. By employing sufficiently slowly evaporating solvents, the maximum upper temperature limit will be determined by the decomposition of the cellulose derivative employed, or of other constituents of the lacquer. Continued heating at high temperatures tends to decompose the cellulose derivatives, giving rise to colored decomposition products, increased acidity, and a permanent (i. e., irreversible) decrease in viscosity, resulting in decreased strength and toughness in the applied films. These effects depend upon the length of time of heating as well as the temperature at which the lacquer is maintained. Thus, lacquer to be maintained for long periods in a supply tank, at the application temperature, should be held at lower temperatures than may be employed if the lacquer is heated immediately before application. The instantaneous viscosity-temperature adjustment of cellulose derivative lacquers is especially advantageous in that it permits the use of instantaneous heaters positioned in the lacquer supply line between the supply tank and the spray gun. In this manner the time of heating may be very short, and high temperatures may be used which would seriously decompose the lacquers if maintained for longer periods of time.

I have found that nitrocellulose lacquers tend to decompose at lower temperatures than lacquers prepared from organic cellulose derivatives such as cellulose acetate or ethyl cellulose. Although heating nitrocellulose lacquers for 30 minutes at 100° C. causes substantially no color change, slight yellowing occurs on continued heating for one hour at this temperature, and greater discoloration occurs on two hours' heating. Such lacquers, when heated for one hour at 130° C. undergo considerable discoloration and a substantial permanent drop in viscosity. The same treatment of cellulose acetate lacquers and ethyl cellulose lacquers causes no discoloration and much less pronounced changes in viscosity. Ethyl cellulose lacquers discolor appreciably on heating for 3½ hours at 135° C.; cellulose acetate lacquers will not discolor as a result of this amount of heating but discolor on additional heating for 4 hours at 170° C. Such lacquers undergo a substantial permanent reduction in viscosity when heated for one hour at 190° C. and discolor on prolonged heating at such temperatures. A general indication of the time-temperature ranges in which undesirable changes occur may be obtained from the following table, in which decomposition effects, as evidenced by changes in acidity and permanent viscosity changes, are noted for representative types of cellulose derivative solutions:

Table II

|  |  | Lacquer #6 | Lacquer #7 | Lacquer #8 | Lacquer #9 | Lacquer #10 | Lacquer #11 | Lacquer #12 | Lacquer #13 |
|---|---|---|---|---|---|---|---|---|---|
| Solids composition (Parts by weight per 100 parts by weight of solvent mixture) | 18–23 centipoise nitrocellulose | 20.8 | | | | | | | |
| | ½ sec. nitrocellulose | | 20.8 | 20.8 | 20.8 | | | | |
| | 30 sec. nitrocellulose | | | | | 10.4 | | | |
| | 3–8 sec. cellulose acetate [1] | | | | | | 5.0 | | |
| | 18–23 sec. cellulose acetate [2] | | | | | | | 5.0 | |
| | 20 centipoise ethyl cellulose | | | | | | | | 3.9 |
| | Ester gum | | | 10.4 | | | | | |
| | Synthetic resin [3] | | | | 20.8 | | | | |
| Solvents composition (Parts by volume) | Butyl acetate | 13.0 | 13.0 | 13.0 | 13.0 | 13.0 | | | |
| | Amyl acetate [4] | 30.5 | 30.5 | 30.5 | 30.5 | 30.5 | | | |
| | Amyl alcohol [5] | 13.0 | 13.0 | 13.0 | 13.0 | 13.0 | | | |
| | Dimethyl phthalate | | | | | | 100 | 100 | 100 |
| | Xylol | 43.5 | 43.5 | 43.5 | 43.5 | 43.5 | | | |
| Viscosity (In centipoises at 25° C. after treatment) | Unheated | 65 | 475 | 530 | 2400 | 1675 | 600 | 1585 | 130 |
| | Heated 30 min. at 100° C | 65 | 415 | 510 | 1925 | 1350 | | | |
| | Heated 120 min. at 100° C | 60 | 330 | 380 | 1325 | 555 | | | |
| | Heated 60 min. at 135° C | | | | | | 575 | 1175 | 120 |
| Acidity (Mg. KOH required to neutralize 10 ml.) | Unheated | 7.4 | 4.8 | 13.5 | 41.5 | 1.5 | 2.6 | 1.4 | 2.3 |
| | Heated 30 min. at 100° C | 8.7 | 5.8 | 14.0 | 38.0 | 1.6 | | | |
| | Heated 120 min. at 100° C | 9.8 | 8.3 | 14.6 | 50.0 | 2.4 | | | |
| | Heated 60 min. at 135° C | | | | | | 2.8 | 1.7 | 3.4 |

[1] Acetyl No.=38.7–39.4.
[2] Acetyl No.=40.1–40.5.
[3] Oil-modified glycerol phthalate resin "Rezyl 19".
[4] "Pentacetate".
[5] "Pentasol".

It is to be understood, of course, that the results in the above table do not represent absolute upper temperature limits but merely indicate ranges in which changes occur, thus enabling the lacquer chemist to choose satisfactory spraying temperatures. It may be found, for example, that in certain types of lacquers, such as highly-pigmented lacquers, decomposition to the extent indicated in this table would not be unduly disadvantageous, and in such cases even higher temperatures and longer periods of heating might be employed. Likewise, of course, much higher temperatures may be utilized for instantaneous heating; and similarly, lower temperatures would be advisable where lacquers are to be maintained at the application temperature for longer periods of time.

Although nitrocellulose lacquers may be sprayed at temperatures as high as 130° C., and lacquers prepared from organic cellulose derivatives may be sprayed at temperatures as high as 180° C. or higher if instantaneous heating is employed, it should be recognized that at such temperatures certain difficulties will be encountered in obtaining satisfactory flow in the applied film, even though the lacquers atomized satisfactorily in the spray gun. As will be pointed out more fully below, the formulation of the lacquers should be changed for high-temperature spraying to provide slower evaporating solvents in order to secure adequate flow in the applied film, and to prevent boiling of the lacquers at high spraying temperatures. Very slowly evaporating solvents are required for this purpose at temperatures above 120° C., thus requiring a prolonged drying period for the wet film of the applied lacquer, and also a long hardening time unless the finish is baked at elevated temperatures. The prolonged drying time, of course, is undesirable not only from the time standpoint, but also from the greater danger of dust adhering to the wet films and greater tendency for the lacquers to sag on vertical surfaces if applied in unduly thick films. For these reasons I prefer to spray the lacquers at liquid temperatures below 120° C., and preferably at temperatures not substantially above 90° C.

The liquid temperature of the lacquer in the spray gun determines the degree of atomization which may be secured with a lacquer having any given viscosity at atmospheric temperature. Other temperature control, such as heating the air for the usual type of compressed air spray gun, or heating the atmosphere through which the spray passes, has no appreciable effect on the atomization. If the atmospheric temperature is increased, or if the air for the spray gun is heated to any considerable extent, the effect is to evaporate the solvents more rapidly in the spray cone. I have found that it is difficult to increase materially the temperature of the lacquer reaching the surface by increasing the temperature of the air for the spray, since the heated compressed air cools rapidly on expansion in the spray cone, and the more rapid evaporation of solvents in the spray also increases the cooling effect. The small increase in the lacquer temperature which can be practically produced by heating the air for the spray gun, or by increasing the atmospheric temperature, of course, tends to maintain the viscosity of the lacquer in the applied film at a lower value, thus tending to improve the flow; but I have found that this effect is offset by an increase in viscosity due to the more rapid evaporation of the solvents, with the result that less satisfactory, rather than more satisfactory flow is generally obtained. Similarly, heating the surface to which the lacquer is applied tends to maintain the lacquer at a higher temperature and lower viscosity until flow is secured; but the higher temperature results in more rapid evaporation of the solvents, thus more than counteracting the former effect, with the result that much less satisfactory flow is usually secured. I prefer, therefore, to heat only the lacquer, and to maintain the air for the spray, and the surfaces to be sprayed, at atmospheric temperature.

Certain lacquers formulated for atmospheric temperature application may be sprayed in accordance with my process, at elevated temperatures, provided that they have been formulated with a sufficiently high proportion of slowly evaporating solvents and diluents. The decreased spraying viscosity secured at the elevated temperature results in greater ease of spray application, due to the greatly improved atomization in the spray gun. This advantage of my process, however, is of minor importance compared with the improvements which may be secured by formulating the lacquers with increased solids content for application at elevated temperatures.

The solvent mixtures utilized for atmospheric temperature spraying may be found to be satisfactory for application at slightly or even moderately elevated temperatures, particularly if such solvent mixtures contain a relatively high proportion of slowly evaporating constituents. However, at relatively high temperatures the usual low boiling solvents will evaporate too rapidly to secure satisfactory flow. In spraying lacquers at atmospheric temperatures, there is a substantial drop in temperature of the lacquer in the spray cone, due to the evaporation of a large amount of the solvent mixture. When the temperature of the lacquer in the spray gun is materially increased, the evaporation of the solvent mixture in the spray cone will be greatly increased, with a resulting greater rise in viscosity of the applied lacquer. The rapid cooling of the hot lacquer in the spray cone, brought about by contact with air at atmospheric temperature, and by the cooling effect of the evaporating solvents, likewise gives rise to a much greater increase in viscosity. The drop in temperature in the spray cone, and the resulting increase in viscosity of the applied lacquer, when spraying lacquers at high temperatures may be as much as six or seven times as great as that resulting from spraying at atmospheric temperature. These factors may result in the application of a relatively dry lacquer coating, having no appreciable flow, or a wet film having greatly reduced flow. In order to counteract these effects, the proportion of high-boiling constituents of the solvent mixture should be materially increased for elevated temperature spraying in such an amount as to provide the prolonged period of flow necessary to produce the desired characteristics in the applied film.

For spraying at moderately increased temperatures, e. g., up to 60° C., the low boiling constituents of the solvent mixtures used at atmospheric temperatures should be decreased and the high-boiling constituents correspondingly increased. Thus, the proportion of solvents and diluents boiling below 110° C., should be materially reduced, and the proportion of high-boiling solvents and diluents, i. e., those boiling from 110–145° C. should be correspondingly increased. By thus reducing the proportion of low-boiling constituents of the solvent mixture, the evaporation in the spray cone is materially reduced and may readily be made to correspond to the evaporation secured in spraying lacquers at atmospheric temperatures.

When the lacquers are to be sprayed at high temperatures, e. g., 60–120° C., the proportion of low-boiling constituents must be still further reduced, and at the higher temperatures in this range the low-boiling constituents should be completely eliminated and a portion of the high-boiling constituents should be replaced by super high-boiling constituents, i. e., solvents and diluents boiling above 145° C. At temperatures substantially above 120° C., the solvent mixture will necessarily contain only super high-boiling constituents, and as has previously been pointed out, this is undesirable from the standpoint of prolonged drying time for the applied films.

In formulating lacquers for use in accordance with my invention, no solvents or diluents should be employed which cause pronounced ebullition of the solvent mixture, at the liquid temperature in the spray gun and the liquid pressure employed. Aside from this fact, a certain proportion of low-boiling constituents may be included in the lacquer for any application temperature, provided the proportion is not sufficiently great to cause too rapid evaporation in the spray cone, with resulting flow difficulties. An outstanding advantage of my process is that in lacquers which may be formulated with low-boiling solvents, ethyl alcohol may be substituted for the more expensive solvents without encountering the blushing difficulties obtained when using this material at ordinary temperatures.

The optimum ratio of low-boiling, high-boiling and super-high-boiling constituents of the solvent mixture for any desired degree of flow will, of course, depend not only upon the particular spraying temperature, but also to some extent upon the solid constituents of the lacquer, and the conditions of application. Thus, lacquers prepared from low-viscosity nitrocellulose and a high proportion of resins will normally have a much higher total solids content than a lacquer prepared from a high viscosity cellulose derivative, with little or no resin. The higher solids content of the former type of lacquer will increase the difficulties of securing adequate flow, and at any given temperature such a lacquer will require a higher ratio of high-boiling constituents to low-boiling constituents than is required for the latter type of lacquer. Also, different flow characteristics may be desired for different application conditions. For example, satisfactory films may be applied by experienced operators, or by the use of automatic spraying equipment, with a lacquer containing a lower ratio of high-boiling constituents to low-boiling constituents than would be desirable in a lacquer for spray application by inexperienced operators. These various factors apply to the formulation of lacquers for spraying at high liquid temperatures, in accordance with my invention, in the same manner that they apply in the formulation of lacquers for spraying at atmospheric temperatures.

The various considerations affecting the flow of the lacquers, as discussed above, will determine the ratio of slowly-evaporating constituents to rapidly-evaporating constituents of the solvent mixture required to secure the desired flow characteristics. This, of course, represents the minimum ratio of slowly evaporating constituents to rapidly evaporating constituents required to produce a film having no more than the maximum roughness or "orange peel" deemed desirable under the particular operating conditions. However, this minimum ratio may be greatly exceeded, and any desired factor of safety with regard to flow characteristics may readily be secured. Low-boiling constituents of the solvent mixture may be completely eliminated in all cases, if desired. Similarly, all high-boiling constituents may be completely eliminated in favor of super-high-boiling constituents, but in this case the prolonged drying time, and the increased danger of sagging in thick films of the applied lacquer, makes it desirable to approach more closely the minimum proportion of super-high-boiling constituents. The examples given below include representative formulations for various types of lacquers and various application temperatures, but these formulations may be modified to secure the particular flow characteristics desired in any specific case.

In addition to increasing the proportion of slowly-evaporating constituents of the solvent mixture, it is also necessary to insure a proper ratio of solvents to diluents. The "tolerance", or "dilution ratio", for any given solvent and diluent tends to decrease substantially with increasing concentration of solids in the solution, and also tends to decrease somewhat with increasing temperature. I have also found that aside from the gelling which may occur if the dilution ratio is exceeded, the tendency of the lacquer to increase in viscosity, as the dilution ratio is approached, is materially increased at elevated temperatures. For these reasons the usual tolerance values for atmospheric temperature spraying should not be relied upon, and the lacquers should be formulated with a solvent mixture having a higher solvent-diluent ratio. The minimum ratio of solvents to diluents will depend upon the specific spraying temperature and upon the other constituents of the lacquer; but this ratio may easily be determined for any particular case, by the usual methods. However, it will be evident that in any case this minimum ratio of solvents to diluents may be greatly exceeded, and that diluents may even be completely eliminated from the lacquers, if desired. Thus, any desired factor of safety with respect to dilution ratio may be obtained. I prefer, in all cases, to provide such a factor of safety, i. e., to employ a proportion of solvents substantially in excess of the dilution ratio at the spraying temperature. Representative formulations with suitable ratios of solvents to diluents for various spraying temperatures are included in the examples below.

The following example illustrates the formulation of a nitrocellulose lacquer containing an oil-modified alkyd resin, for application at various elevated temperatures, in accordance with my invention. This type of lacquer is representative of lacquers of high solids content for application at atmospheric temperature, and it may be seen that in accordance with the present invention, extremely high solids content may readily be secured.

*Example I*

| Component | | Application temperature | | | | | |
|---|---|---|---|---|---|---|---|
| | | 25° C. | 40° C. | 50° C. | 60° C. | 90° C. | 110° C. |
| Solid components [1] | ½ sec. nitrocellulose | 9.2 | 11.0 | 12.0 | 13.0 | 16.0 | 19.8 |
| | Synthetic resin [3] | 13.9 | 16.5 | 18.0 | 19.5 | 24.0 | 29.7 |
| | Dibutyl phthalate | 3.5 | 3.7 | 4.0 | 4.3 | 6.0 | 7.5 |
| | Carbon black | 2.4 | 2.8 | 3.0 | 3.2 | 4.0 | 5.0 |
| Total solids | | 29.0 | 34.0 | 37.0 | 40.0 | 50.0 | 62.0 |
| Solvent components [2] | Ethyl alcohol | 5 | 6 | 6 | 7 | | |
| | Ethyl acetate | 10 | 5 | | | | |
| | Butyl alcohol | 10 | 13 | 14 | 15 | 20 | |
| | Butyl acetate | 20 | 26 | 30 | 18 | 15 | |
| | Butyl propionate | | | | 15 | 15 | |
| | Methyl lactate | | | | | 10 | 60 |
| | Toluol | 55 | 50 | 25 | | | |
| | Xylol | | | 25 | 45 | 40 | 40 |

[1] Parts by weight per 100 parts by weight of solvent mixture.
[2] Parts by volume.
[3] Oil-modified glycerol-phthalate resin—"Rezyl 19".

The following examples illustrate formulations of nitrocellulose lacquers containing other types of resins, for application at 50° C.:

*Example II*

| | Parts by weight |
|---|---|
| Nitrocellulose (¼ sec.) | 15 |
| Dammar | 21 |
| Tricresyl phosphate | 4 | incorporated in 100 parts by weight of the following solvent mixture:

| | Parts by volume |
|---|---|
| Ethyl alcohol | 8 |
| Butyl acetate | 35 |
| Butyl alcohol | 12 |
| Toluol | 25 |
| Petroleum naphtha (boiling range 120–145° C.) | 20 |

*Example III*

| | Parts by weight |
|---|---|
| Nitrocellulose (5 sec.) | 7 |
| Ester gum | 6 |
| Dibutyl phthalate | 2 |
| Lead chromate pigment | 6 | incorporated in 100 parts by weight of the following solvent mixture:

| | Parts by volume |
|---|---|
| Ethyl alcohol | 8 |
| Butyl acetate | 30 |
| Butyl alcohol | 12 |
| Xylol | 50 |

In all of the above examples the lacquers have been formulated to secure a viscosity of the order of 40 centipoises at the elevated spraying temperatures. This represents the most common spraying viscosity at atmospheric temperature. However, it will be evident that the lacquers may be formulated to secure other degrees of viscosity at the spraying temperature, for use with special types of spraying equipment, or for other purposes. In certain instances it will be found to be desirable to spray at viscosities below 40 centipoises, even with the standard type of spray gun. Thus, if it is found that at the desired spraying temperature such a high proportion of slow-evaporating solvents is required for satisfactory flow that the drying time of the lacquer is unduly prolonged, more rapidly-evaporating solvents may be utilized if the ratio of total solvent mixture to solids is increased. In this manner the lacquer will be sprayed at a viscosity lower than 40 centipoises, and the greatest possible increase in solids content will thus not be secured. However, by this procedure a very substantial increase in solids content may still be obtained with satisfactory flow and short drying time. The following example illustrates a nitrocellulose lacquer for application at 90° C. with a spraying viscosity of approximately 25 centipoises:

*Example IV*

| | Parts by weight |
|---|---|
| Nitrocellulose (¼ sec.) | 13.0 |
| Alkyd resin (rezyl 19) | 19.5 |
| Dibutyl phthalate | 4.3 |
| Carbon black | 3.2 | incorporated in 100 parts by weight of the following solvent mixture:

| | Parts by volume |
|---|---|
| Butyl alcohol | 22 |
| Butyl acetate | 18 |
| Butyl propionate | 15 |
| Xylol | 45 |

By comparison with Example I, it will be seen that this formulation approximates the formulation for spraying at a liquid temperature of 60° C., with a spraying viscosity of 40 centipoises.

It is thus seen that in accordance with my process, the lacquers may be formulated for any desired spraying viscosity and that an increase in solids content may be secured at elevated temperatures, even with a relatively low spraying viscosity. In general, I prefer to formulate the lacquers to secure a spraying viscosity, at the spraying temperature, of 20–60 centipoises, and preferably 25–50 centipoises.

The following examples illustrate the formulation of cellulose acetate lacquers and ethyl cellulose lacquers for application at various elevated temperatures:

*Example V*

| Component | | Application temperature | | | |
|---|---|---|---|---|---|
| | | 25° C. | 50° C. | 90° C. | 120° C. |
| Solid components [1] | 2 sec. cellulose acetate [3] | 7.0 | 8.8 | 10.8 | 15.0 |
| | Dibutyl tartrate | 1.5 | 1.7 | 2.2 | 3.0 |
| Total solids | | 8.5 | 10.5 | 13.0 | 18.0 |
| Solvent components [2] | Acetone | 30 | | | |
| | Ethyl acetate | 40 | 40 | | |
| | Butyl acetate | 10 | 20 | 25 | |
| | Butyl alcohol | | | 15 | |
| | Methyl lactate | 10 | 20 | 20 | 40 |
| | 1-nitrobutane | | | 20 | |
| | Diacetone alcohol | | | | 40 |
| | Toluol | 10 | 20 | | |
| | Xylol | | | 20 | 10 |
| | Solvent naphtha (B. P. 140–180° C.) | | | | 10 |

[1] Parts by weight per 100 parts by weight of solvent mixture.
[2] Parts by volume.
[3] Acetyl No.=38.7–39.4.

Example VI

| Component | | Application temperature | | | |
|---|---|---|---|---|---|
| | | 25° C. | 50° C. | 90° C. | 110° C. |
| Solid components [1] | 20 centipoise ethyl cellulose | 7.2 | 8.3 | 12.7 | 15.0 |
| | Ester gum | 3.6 | 4.2 | 6.3 | 7.5 |
| | Dibutyl phthalate | 2.2 | 2.5 | 4.0 | 4.5 |
| Total solids | | 13.0 | 15.0 | 23.0 | 27.0 |
| Solvent components [2] | Ethyl alcohol | 20 | 10 | | |
| | Butyl alcohol | 10 | 20 | 15 | |
| | Butyl acetate | | | 15 | |
| | Diacetone alcohol | | | | 30 |
| | Toluol | 70 | 70 | | |
| | Xylol | | | 70 | 35 |
| | Solvent naphtha (B. P. 140-180° C.) | | | | 35 |

[1] Parts by weight per 100 parts by weight of solvent mixture.
[2] Parts by volume.

It is to be understood, of course, that the above examples are merely illustrative and do not limit the scope of my invention. Lacquers having various other concentrations of solid constituents may readily be formulated, the only upper limit of concentration being such a concentration that requires a temperature, to reduce the viscosity to the desired spraying viscosity, sufficiently high to give rise to excessive decomposition of the lacquer. It may be said that, irrespective of the concentration of the solid components of the lacquer, below such limit, my process is generally applicable to securing a desired reduction in spraying viscosity over that obtainable with said lacquer when spraying at atmospheric temperature. By atmospheric temperature, in this regard, is meant the temperature which would be maintained in the lacquer in the spray gun as a result of the prevailing temperature of the atmosphere surrounding the spraying equipment, in the absence of any preferential heating of the lacquer supply.

The formulation of the lacquers for use in accordance with my process may be varied in accordance with known practices in the art, and various other equivalent materials may be substituted for those specifically mentioned in the examples. Similarly, my process may be applied in conjunction with spraying methods other than the common compressed air spray, as, for example, methods depending upon very high liquid pressure for atomization. Any such modification of procedure, and the use of any equivalents which would naturally occur to one skilled in the art, are included in the scope of my invention.

This application is a continuation-in-part of my application U. S. Serial No. 159,318, filed August 16, 1937.

My invention now having been described, what I claim is:

1. In a process for coating a surface by spraying thereon a cellulose derivative lacquer comprising a cellulose derivative and a volatile solvent component which is an active solvent for said cellulose derivative at atmospheric pressure, said lacquer having a concentration of solid constituents producing an undesirably high viscosity for spraying at the atmospheric temperature, the steps which comprise heating said lacquer to a temperature sufficiently above the atmospheric temperature to reduce the viscosity thereof to the desired spraying viscosity at the spraying temperature, but below a temperature at which excessive decomposition takes place during the time of heating thereof, providing in the solvent component of said lacquer at least one slowly evaporating constituent of such a character and in such a proportion to prevent substantial ebullition at the spraying temperature and pressure and to secure the desired flow characteristics in the applied film, and spraying the hot lacquer onto the said surface.

2. In a process for coating a surface by spraying thereon a cellulose derivative lacquer comprising a cellulose derivative and a volatile solvent component which is an active solvent for said cellulose derivative at atmospheric temperature and which contains solvent and diluent constituents, said lacquer having a concentration of solid constituents producing an undesirably high viscosity for spraying at the atmospheric temperature, the steps which comprise heating said lacquer to a temperature sufficiently above the atmospheric temperature to reduce the viscosity thereof to the desired spraying viscosity at the spraying temperature, but below a temperature at which excessive decomposition takes place during the time of heating thereof, providing in the solvent component of said lacquer a solvent-to-diluent ratio substantially above the dilution ratio at the spraying temperature, providing slowly evaporating constituents of such a character and in such a proportion to prevent substantial ebullition at the spraying temperature and pressure and to secure the desired flow characteristics in the applied film, and spraying the hot lacquer onto the said surface.

3. In a process for coating a surface by spraying thereon a cellulose derivative lacquer comprising a cellulose derivative and a volatile solvent component which is an active solvent for said cellulose derivative at atmospheric temperature, said lacquer having a concentration of solid constituents producing a viscosity at the atmospheric temperature substantially above 60 centipoises, the steps which comprise heating said lacquer to a temperature sufficiently above the atmospheric temperature to reduce the viscosity thereof at the spraying temperature to 20–60 centipoises, but below a temperature at which excessive decomposition takes place during the time of heating thereof, providing in the solvent component of said lacquer at least one slowly evaporating constituent of such a character and in such a proportion to prevent substantial ebullition at the spraying temperature and pressure and to secure the desired flow characteristics in the applied film, and spraying the hot lacquer onto the said surface.

4. In a process for coating a surface by spraying thereon a cellulose derivative lacquer comprising a cellulose derivative and a volatile solvent component which is an active solvent for said cellulose derivative at atmospheric temperature and which contains slowly evaporating and rapidly evaporating solvent and diluent constituents, said lacquer having a concentration of solid constituents producing an undesirably high viscosity for spraying at the atmospheric temperature, the steps which comprise heating said lacquer to a temperature sufficiently above the atmospheric temperature to reduce the viscosity thereof to the desired spraying viscosity at the spraying temperature, but below a temperature at which excessive decomposition takes place during the time of heating thereof, providing a rapidly evaporating constituent of the solvent component of said lacquer in the form of ethyl alcohol, providing slowly evaporating constituents of such a character and in such a proportion to prevent substantial ebullition at the spraying temperature and pressure and to secure the desired flow characteristics in the applied film, and spraying the hot lacquer onto the said surface.

5. In a process for coating a surface by spraying thereon a nitrocellulose lacquer comprising nitrocellulose and a volatile solvent component which is an active solvent for nitrocellulose at atmospheric temperature, said lacquer having a concentration of solid constituents producing an undesirably high viscosity for spraying at the atmospheric temperature, the steps which comprise heating said lacquer to a temperature not substantially above 120° C. but sufficiently above the atmospheric temperature to reduce the viscosity thereof to the desired spraying viscosity at the spraying temperature, providing in the solvent component of said lacquer at least one slowly evaporating constituent of such a character and in such a proportion to prevent substantial ebullition at the spraying temperature and pressure and to secure the desired flow characteristics in the applied film, maintaining the said lacquer at the elevated temperature for a sufficiently short time to prevent excessive decomposition thereof, and spraying the hot lacquer onto the said surface.

6. In a process for coating a surface by spraying thereon a nitrocellulose lacquer comprising nitrocellulose and a volatile solvent component which is an active solvent for nitrocellulose at atmospheric temperature and which contains solvent and diluent constituents, said lacquer having a concentration of solid constituents producing a viscosity at the atmospheric temperature substantially above 50 centipoises, the steps which comprise heating said lacquer to a temperature not substantially above 90° C. but sufficiently above the atmospheric temperature to reduce the viscosity thereof at the spraying temperature to 25–50 centipoises, providing in the solvent component of said lacquer a solvent-to-diluent ratio substantially in excess of the dilution ratio at the spraying temperature, providing slowly evaporating constituents of such a character and in such a proportion to prevent substantial ebullition at the spraying temperature and pressure and to secure the desired flow characteristics in the applied film, maintaining the lacquer at the elevated temperature for a sufficiently short time to prevent excessive decomposition thereof, and spraying the hot lacquer onto the said surface.

CHARLES BOGIN.

---

CERTIFICATE OF CORRECTION.

Patent No. 2,150,096.   March 7, 1939.

CHARLES BOGIN.

It is hereby certified that error appears in the printed specification of the above numbered patent requiring correction as follows: Page 2, first column, line 33, Table II, in the column headed "Lacquer #10", for "555" read 575; and line 34, same table, in the column headed "Lacquer #11", for "575" read 555; page 6, first column, line 65, claim 1, for "pressure" read "temperature; and that the said Letters Patent should be read with this correction therein that the same may conform to the record of the case in the Patent Office.

Signed and sealed this 16th day of May, A.D. 1939.

Henry Van Arsdale
Acting Commissioner of Patents.

(Seal)

ing thereon a cellulose derivative lacquer comprising a cellulose derivative and a volatile solvent component which is an active solvent for said cellulose derivative at atmospheric temperature and which contains slowly evaporating and rapidly evaporating solvent and diluent constituents, said lacquer having a concentration of solid constituents producing an undesirably high viscosity for spraying at the atmospheric temperature, the steps which comprise heating said lacquer to a temperature sufficiently above the atmospheric temperature to reduce the viscosity thereof to the desired spraying viscosity at the spraying temperature, but below a temperature at which excessive decomposition takes place during the time of heating thereof, providing a rapidly evaporating constituent of the solvent component of said lacquer in the form of ethyl alcohol, providing slowly evaporating constituents of such a character and in such a proportion to prevent substantial ebullition at the spraying temperature and pressure and to secure the desired flow characteristics in the applied film, and spraying the hot lacquer onto the said surface.

5. In a process for coating a surface by spraying thereon a nitrocellulose lacquer comprising nitrocellulose and a volatile solvent component which is an active solvent for nitrocellulose at atmospheric temperature, said lacquer having a concentration of solid constituents producing an undesirably high viscosity for spraying at the atmospheric temperature, the steps which comprise heating said lacquer to a temperature not substantially above 120° C. but sufficiently above the atmospheric temperature to reduce the viscosity thereof to the desired spraying viscosity at the spraying temperature, providing in the solvent component of said lacquer at least one slowly evaporating constituent of such a character and in such a proportion to prevent substantial ebullition at the spraying temperature and pressure and to secure the desired flow characteristics in the applied film, maintaining the said lacquer at the elevated temperature for a sufficiently short time to prevent excessive decomposition thereof, and spraying the hot lacquer onto the said surface.

6. In a process for coating a surface by spraying thereon a nitrocellulose lacquer comprising nitrocellulose and a volatile solvent component which is an active solvent for nitrocellulose at atmospheric temperature and which contains solvent and diluent constituents, said lacquer having a concentration of solid constituents producing a viscosity at the atmospheric temperature substantially above 50 centipoises, the steps which comprise heating said lacquer to a temperature not substantially above 90° C. but sufficiently above the atmospheric temperature to reduce the viscosity thereof at the spraying temperature to 25-50 centipoises, providing in the solvent component of said lacquer a solvent-to-diluent ratio substantially in excess of the dilution ratio at the spraying temperature, providing slowly evaporating constituents of such a character and in such a proportion to prevent substantial ebullition at the spraying temperature and pressure and to secure the desired flow characteristics in the applied film, maintaining the lacquer at the elevated temperature for a sufficiently short time to prevent excessive decomposition thereof, and spraying the hot lacquer onto the said surface.

CHARLES BOGIN.

---

CERTIFICATE OF CORRECTION.

Patent No. 2,150,096.     March 7, 1939.

CHARLES BOGIN.

It is hereby certified that error appears in the printed specification of the above numbered patent requiring correction as follows: Page 2, first column, line 33, Table II, in the column headed "Lacquer #10", for "555" read 575; and line 34, same table, in the column headed "Lacquer #11", for "575" read 555; page 6, first column, line 65, claim 1, for "pressure" read "temperature; and that the said Letters Patent should be read with this correction therein that the same may conform to the record of the case in the Patent Office.

Signed and sealed this 16th day of May, A.D. 1939.

Henry Van Arsdale
Acting Commissioner of Patents.

(Seal)